Figure 1:
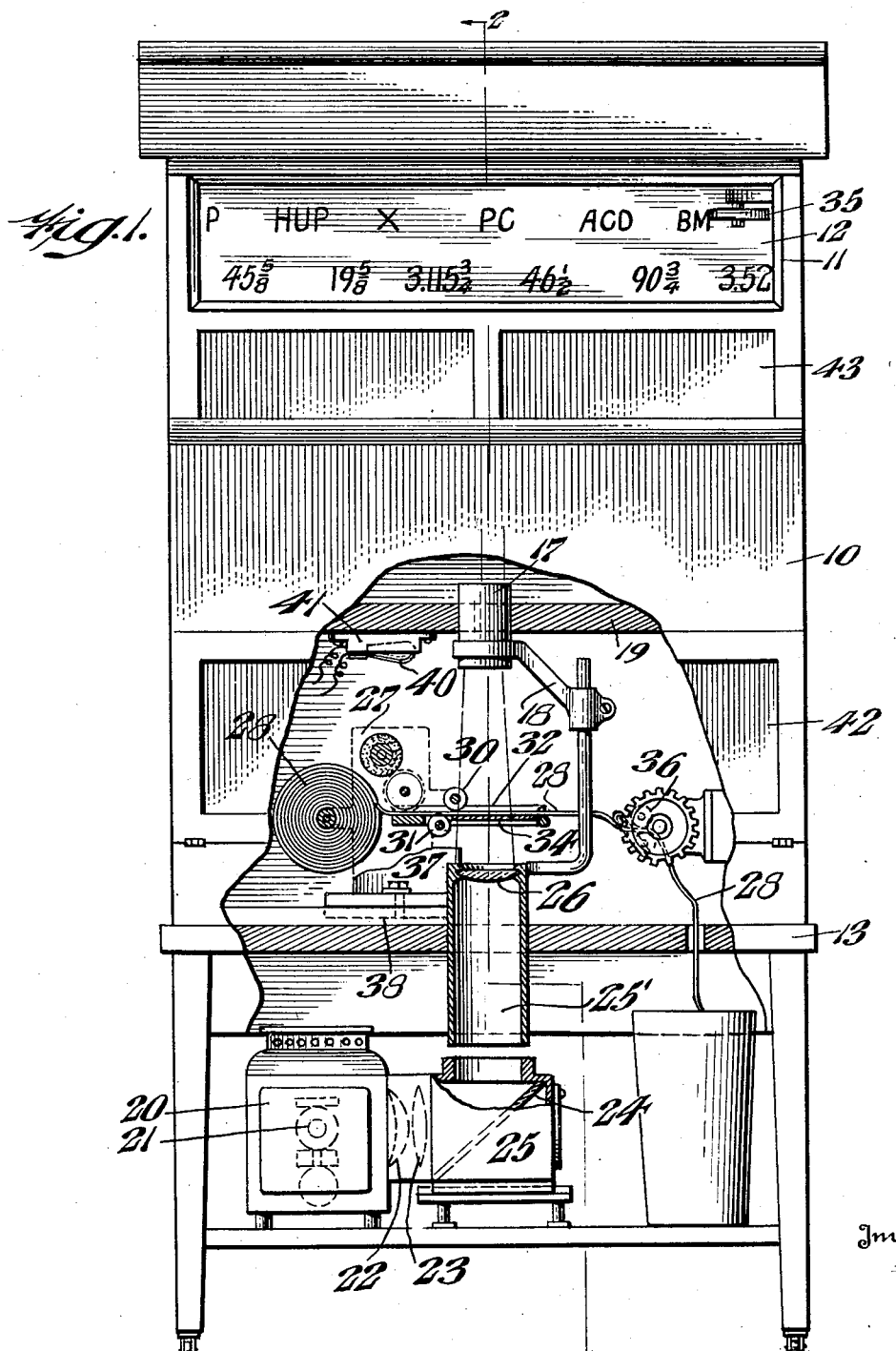

Feb. 24, 1931. J. H. CHIDESTER 1,794,147
PROJECTING APPARATUS
Filed March 22, 1926 3 Sheets-Sheet 1

Inventor
John H. Chidester,
by Robert M. Barr, Attorney

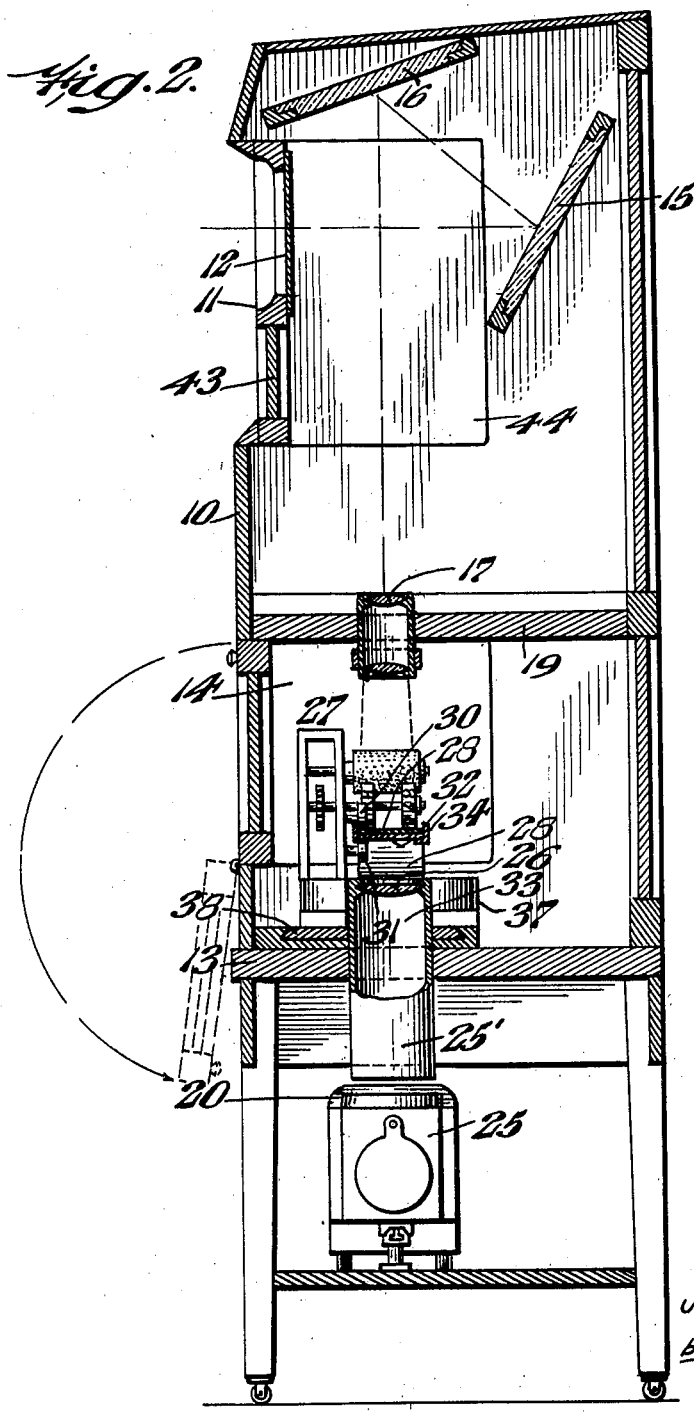

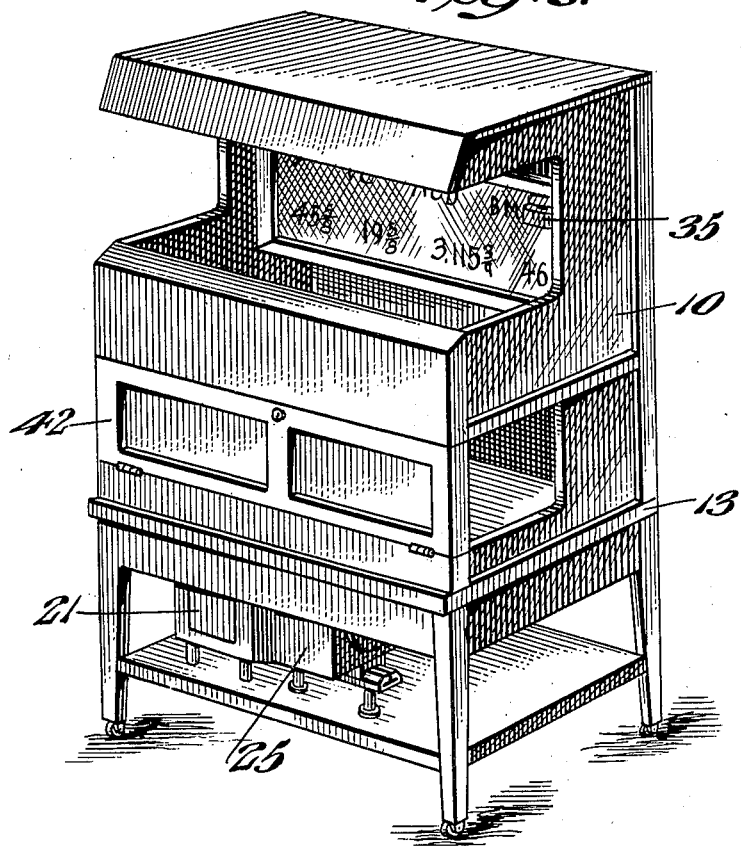
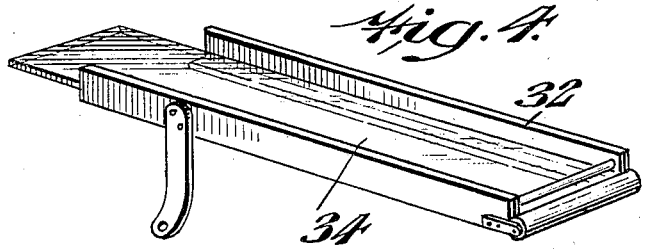

Patented Feb. 24, 1931

1,794,147

UNITED STATES PATENT OFFICE

JOHN HARTFORD CHIDESTER, OF CHATHAM, NEW JERSEY

PROJECTING APPARATUS

Application filed March 22, 1926. Serial No. 96,524.

The present invention relates to projection apparatus for throwing the image of an object upon a screen or wall in magnified form, and relates more particularly to an apparatus for visibly showing an enlarged representation of a ticker tape such as used in brokers' offices and stock exchanges for recording and visibly showing the transaction in commodities being bought and sold.

Some of the objects of the present invention are to provide an improved projection apparatus for displaying in enlarged form data recorded upon a movable tape; to provide an apparatus whereby the enlarged projected image of tape data appears as clear and distinct as upon the original tape; to provide an improved projecting apparatus whereby quotations or other data or material upon a traveling tape are displayed coincidently with the delivery of the tape from the ticker machine; to provide an improved apparatus for projecting tape data in such a manner that blurring of the recorded data is pervented; to provide a projection apparatus wherein the ink feeding roll of the ticker machine is maintained at ordinary room temperature; and to provide other improvements as will hereinafter appear.

In the accompanying drawings, Fig. 1 represents a front elevation, partly broken away, of a projecting apparatus embodying one form of the present invention; Fig. 2 represents a section on line 2—2 of Fig. 1; Fig. 3 represents a perspective of a machine embodying a modified form of the invention; and Fig. 4 represents a perspective of one form of tape guide.

Referring to the drawings, one form of the present invention comprises a cabinet 10 provided with a transverse opening 11 located at a suitable place but preferably across the top front portion of the cabinet 10 and in this opening 11 there is located a daylight glass 12 or other suitable daylight screen which will visibly display the desired projected data. A shelf or base 13 is located transversely of the cabinet 10 in a predetermined position to operatively support the apparatus. In close proximity to the base 13, the sides of the cabinet are preferably cut away to form openings 14 by which access can be had to the apparatus mounted upon the base.

For the purpose of registering the image of the projected object upon the screen 12, a mirror 15 is provided and mounted transversely across the rear portion of the cabinet 10 in the horizontal plane of the opening 11, said mirror 15 being inclined at the proper angle to receive the projected light beams from a second mirror 16 and transmit them to the screen 12. The mirror 16 is likewise a transversely arranged mirror but is mounted above the opening 11 and is of a length substantially the same as the opening 11 while its angle of inclination is such as to properly receive the light rays from a wide angle projecting lens 17. In the present instance, the light rays from the lens 17 are projected vertically upward and diverge to properly register the image upon the mirror 16 so that it will be reflected in its entirety upon the aforesaid mirror 15. The lens 17 is mounted for focusing adjustment in a bracket 18 carried from the base 13 and is positioned within an opening in a partition 19 which extends transversely of the cabinet to form an enclosed shadow or darkened chamber in the upper portion of the cabinet.

For the purpose of transmitting light rays to the lens 17, a projecting lantern 20 of any well known type may be employed, and in this instance transmits the rays of light from its lamp 21, by way of a meniscus lens 22, and through a double convex lens 23 to a mirror 24. This mirror 24 is enclosed in a box 25 and at an angle to reflect the light rays upwardly upon a relatively large planoconvex lens 26 whereby such reflecting light rays will be focused upon a projecting lens 17. In the present construction, the lens 26 is mounted at the upper end of a tube 25', the lower extremity of which terminates in close proximity to the opening of the box 25 from which the light rays are projected.

As a means for bringing the object to be projected into the path of the light rays from the lens 26, the preferred form of the invention employs a ticker instrument 27 of any well known construction having in this instance a transparent tape 28 which is intermittently fed in the manner of such ticker instruments between feed rollers 30 and 31. As the tape 28 leaves the instrument 27 it enters a guide trough 32 which is above and in register with the lens 26. The bottom of this trough is provided with a glass covered slot 34 so that the entire width of the tape is exposed to the light rays as it feeds along the trough 32 and the length of the slot is such as to expose the necessary length of tape to produce an image across the full length of the screen 12. In connection with this slot 34 and its relation to the rays of light it should be particularly noted that it also extends beneath the feed roll 30 of the ticker so that the latter, in addition to the tape, is in the path of the light rays and is projected so that its image 35 also appears upon the screen 12. The maximum length of the projected tape and the tape discharge means is obtained by locating the plano-convex lens 26 in close proximity to the bottom of the guide trough 32, and consequently the projected beams of light as they converge to the lens 17 intercept a length of the tape and its discharge means, which is proportioned to the size of the screen 12. In other words, the portion of the tape which is in the path of the rays is sufficient to cast a full-sized image thereof, which fills the screen 12. This is a particularly advantageous feature where the apparatus is used for projecting stock quotations because the image of the quotation appears upon the screen 12 at the instant it passes the feed roll 30 or the roll which last comes in contact with the tape as it leaves the ticker instrument. Any suitable tension maintaining means for the tape 28 may be provided but preferably a friction device 36 is employed of the clock driven type and which allows the tape to automatically release so that its intermittent feeding can properly take place.

In order to facilitate the changing of the tape or to make adjustments of the ticker, the instrument 27 is rotatably mounted upon a base 37 which is fast to a base plate 38, the latter being arranged for sliding movement so that the instrument 27 can be pulled back from its operating position and then turned so that the ticker parts are readily accessible through the opening 14.

One of the essential requirments of an apparatus of this character is the projection of an image which is clear, distinct, and of uniform brilliancy throughout so that all data or characters therein are equally legible and can be read quickly and accurately. In devices of this kind as heretofore employed this requirement has not been fulfilled because uniform illumination of the image has not been possible as such devices have been constructed, and the general result has been to obtain an image sharp in one portion and with other portions indistinct, blurred and shadowy. By the present invention this advantage has been entirely overcome and the projected image appears equally bright and sharp throughout its width and length. Furthermore, in prior devices the necessary relation of the inking devices and the printed tape with respect to the projecting lamp has brought the ink into the zone of heat radiated from the lamp so that the ink quickly dries and fails to leave a clean cut impression upon the tape. The apparatus of the present invention locates the projecting lamp remote from the tape or its inking devices and in a part of the cabinet 10 which is open to the atmosphere and entirely cut off by the base partition 13 from the ticker and its adjuncts.

Another disadvantage of ticker projecting mechanisms has been that while a portion of the tape appears upon the screen it is a portion which is some distance from the discharge of the ticker and consequently a considerable time interval elapses after the tape leaves the ticker before it reaches the place where it is acted upon by the projecting apparatus. This lost time element, which is a serious drawback to tape reading, is eliminated in the apparatus of this invention because the projection includes a part of the ticker and the instant a quotation is printed its image appears upon the screen 12. It should also be noted that the compartment within which the ticker 27 is located is preferably provided with an electric lamp 40 mounted in a reflector 41, which lamp is positioned above the ticker and as here shown is supported from the bottom of the partition 19. This lamp is provided for the purpose of illuminating the ticker when it is desired to replace the tape or readjust the instrument, but also serves as a means for illuminating the tape in case the projection apparatus is not in use. Thus, if for any reason the projection mechanism is not in operation, an opaque tape of the usual type can be substituted for the transparent tape, and by turning the ticker around so that the tape is on the front portion it can be read as the ordinary ticker tape by lowering the front panel 42 as indicated in dotted lines. The modified form of the invention is made possible by making the panel 43 in which the opening 11 is located a removable panel and also providing removable side panels 44 so that by removing these panels and substituting for the mirror 15 a suitable screen the image of the tape data will appear directly upon the screen at the back of the cabinet and can be viewed from either the front or from the sides as will be apparent.

While only two forms are shown in which this invention may be embodied, it is to be understood that the invention is not limited to any specific construction, but might be applied to various forms without departing

Having thus described my invention, I claim:

1. A projecting apparatus comprising in combination a cabinet having a transverse opening therein, a display screen across said opening, a projecting lantern, a ticker mechanism between said screen and said lantern, means including a plurality of lenses for projecting light rays from said lantern upon said screen, a transparent tape printed upon and delivered by said ticker, means for feeding said tape transversely of the light rays from said lantern, and means for preventing the radiated heat of said lantern from reaching said ticker mechanism.

2. A projecting apparatus comprising in combination a ticker mechanism having a tape discharge means, a tape, means for feeding said tape in a predetermined path, a display screen, a projecting lantern, and means including a plurality of lenses for projecting rays of light to intercept said tape discharge means and a portion of said tape to produce a magnified image upon said screen of said discharge means and said tape.

3. A projecting apparatus comprising in combination a ticker mechanism having a tape discharge means, a tape, means for feeding said tape in a predetermined path, a display screen, a plano-convex lens mounted in close proximity to one side of said tape, a lens between said display screen and the other side of said tape, and means including a meniscus lens and a double convex lens for projecting rays of light upon said plano-convex lens on the opposite side of said lens from said display screen.

4. A self-contained projecting apparatus comprising a cabinet having two superposed chambers, one of said chambers being provided with a sight opening, a display screen visible through said opening, a device for reflecting an image upon said screen, a ticker mechanism in the other of said chambers, a tape for said mechanism, a lens arranged to pass light rays from one chamber to the other and direct said rays upon said reflecting device, a second lens aligned with said first lens and arranged to pass said light rays in a path to intercept said tape and the delivery end of said ticker mechanism, and means interposed between said medium and said second lens for distributing said light rays with equal luminosity across the exposed area of said tape whereby the image on said screen is uniformly focussed.

5. A projecting apparatus comprising a display screen, means including a projecting lantern for illuminating said screen, a transparent tape arranged to intercept the projected light rays from said lantern, a ticker mechanism remote from said lantern and radiated heat therefrom for feeding said tape, and means to produce a magnified image of characters on said tape upon said screen.

Signed at Philadelphia, county of Philadelphia, State of Pennsylvania, this 3rd day of March, 1926.

JOHN HARTFORD CHIDESTER.